US011483699B2

(12) United States Patent
Ullah et al.

(10) Patent No.: US 11,483,699 B2
(45) Date of Patent: Oct. 25, 2022

(54) INITIAL NETWORK ACCESS FOR A SUBSCRIBER ENTITY

(71) Applicant: Telefonaktiebolaget LM Ericsson (publ), Stockholm (SE)

(72) Inventors: Kazi Wali Ullah, Espoo (FI); Abu Shohei Ahmed, Espoo (FI); Patrik Salmela, Espoo (FI); Bernard Smeets, Dalby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/767,988

(22) PCT Filed: Nov. 30, 2017

(86) PCT No.: PCT/EP2017/081001
§ 371 (c)(1),
(2) Date: May 28, 2020

(87) PCT Pub. No.: WO2019/105558
PCT Pub. Date: Jun. 6, 2019

(65) Prior Publication Data
US 2021/0195403 A1 Jun. 24, 2021

(51) Int. Cl.
*H04W 8/20* (2009.01)
*H04W 48/16* (2009.01)
*H04W 60/00* (2009.01)

(52) U.S. Cl.
CPC ........... *H04W 8/205* (2013.01); *H04W 48/16* (2013.01); *H04W 60/00* (2013.01)

(58) Field of Classification Search
CPC ...... H04W 8/205; H04W 60/00; H04W 48/16
See application file for complete search history.

(56) References Cited

U.S. PATENT DOCUMENTS

2014/0141763 A1* 5/2014 Suh .................... H04L 41/0806
455/418
2016/0173406 A1* 6/2016 Geller .................. H04L 9/3239
709/225

(Continued)

OTHER PUBLICATIONS

Nokia—3GPP TSG SA WG3 (Security) Meeting SA3-NextGen S3-161353; Sep. 27-29, 2016, San Diego, USA.*

(Continued)

*Primary Examiner* — Minjung Kim
(74) *Attorney, Agent, or Firm* — Rothwell, Figg, Ernst & Manbeck, P.C.

(57) ABSTRACT

There is provided mechanisms for initial network access of a subscriber entity to a radio access network. A method is performed by the subscriber entity. The method comprises transmitting an attach message towards a network node. The attach message indicates a request for network access of the subscriber entity to a radio access network of the network node. The method comprises receiving an identification request originating from the network node. The identification request requests identification of the subscriber entity. The method comprises transmitting a response message towards the network node. The response message comprises an Access Identifier of the subscriber entity. The Access Identifier indicates that the subscriber entity is subscriptionless. The method comprises receiving a grant from the network node. The grant allows the subscriber entity limited network access.

22 Claims, 7 Drawing Sheets

(56) References Cited

U.S. PATENT DOCUMENTS

| | | | |
|---|---|---|---|
| 2016/0283216 A1* | 9/2016 | Gao | H04W 12/40 |
| 2017/0041733 A1* | 2/2017 | Babbage | H04W 4/70 |
| 2017/0332312 A1 | 11/2017 | Jung et al. | |
| 2019/0069122 A1* | 2/2019 | Karimli | H04M 15/723 |
| 2019/0268757 A1* | 8/2019 | Yi | H04W 76/10 |
| 2020/0260259 A1* | 8/2020 | Zhang | G08G 5/0013 |
| 2020/0371777 A1* | 11/2020 | Zhang | H04L 9/06 |

OTHER PUBLICATIONS

Huawei et al., "Secure Mechanism to Achieve Remote Credential Provisioning for IOT devices", 3GPP TSG SA WG3 KSecurity) Meeting #84; S3-161000; Jul. 25-29, 2016, Chennai, India. (4 pages).

International Search Report and Written Opinion dated May 16, 2018 issued in International application No. PCT/EP2017/081001. (11 pages).

GSM Association, "Embedded SIM Remote Provisioning Architecture", Official Document 12FAST.13, Version 1.1 (Dec. 2013). (84 pages).

Qualcomm Incorporated, "Discussion on provisioning of credentials", 3GPP TSG SA WG3 (Security) Meeting #85; S3-161739; Nov. 7-11, 2016, Santa Cruz de Tenerife (Spain). (1 page).

\* cited by examiner

INITIAL NETWORK ACCESS FOR A SUBSCRIBER ENTITY

CROSS REFERENCE TO RELATED APPLICATION(S)

This application is a 35 U.S.C. § 371 National Stage of International Patent Application No. PCT/EP2017/081001, filed Nov. 30, 2017, designating the United States.

TECHNICAL FIELD

Embodiments presented herein relate to a method, a subscriber entity, a computer program, and a computer program product for initial network access of the subscriber entity to a radio access network. Further embodiments presented herein relate to a method, a network node, a computer program, and a computer program product for allowing initial network access of the subscriber entity to the radio access network. Further embodiments presented herein relate to a method, a subscription portal entity, a computer program, and a computer program product for authentication of the subscriber entity.

BACKGROUND

Mobile networks are being used to connect all sorts of devices for a wide range of services; automated reading of utility meters, intelligent connectivity of cars and commercial vehicles to enable drivers to access navigation, infotainment or breakdown services, traffic lights, home security and assisted living.

A subscriber identity module or subscriber identification module (SIM) is an integrated circuit chip that is intended to securely store the international mobile subscriber identity (IMSI) number and its related key, as well as other information relevant for the subscription, which is used to identify and authenticate subscriptions on the devices. The SIM circuit is part of the function of a Universal Integrated Circuit Card (UICC) physical smart card.

The GSM Association (GSMA), where GSM is short for Global System for Mobile communications, has released a technical specification denoted SGP.22-RSP V2.1, below denoted SGP.22v2.1, defining remote SIM provisioning for consumer devices and a technical specification denoted SGP.02 disclosing a remote provisioning architecture for embedded UICC (eUICC), which targets machine-to-machine (M2M) type communications devices.

In remote SIM provisioning, the operator uses an entity called SM-DP+/SM-DP (where SM-DP is short for Subscription Management-Data Preparation) for creation of SIM profiles, such as universal (U)SIM profiles, that are later installed from the SM-DP/SM-DP+ to the eUICC. For the consumer devices, the profile is installed through a Local Profile Assistant (LPA) on the consumer device to the Issuer Security Domain Profile (ISD-P) on the device, such as on the eUICC. For the M2M devices, the SM-DP installs the profile via a separate (external) entity, SM-SR, to the ISD-P on the device.

In order for the profile to be downloaded to the device, the device first needs to establish a network connection.

In some cases, such as for Embedded SIM devices, the initial network connectivity to download the initial profile might be performed over a non-cellular radio network, such as Wi-Fi. This means that the device has to have a radio network interface that supports Wi-Fi in addition to the interface for cellular radio network. This adds cost and space in the device for a feature potentially only needed for the first profile download.

It is noted that the device, even without a valid subscription or IMSI, can receive some cellular radio network information and thus learn which mobile network operators are available. However, the device is not allowed to establish an operational connection to any of the mobile network operators without first having a valid subscription and IMSI.

It might be possible for the device to use alternative credentials to attach to the network. An example of such alternative credentials is device certificates, see "Secure Mechanism to Achieve Remote Credential Provisioning for IoT devices" as available at http://portal.3gpp.org/ngppapp/CreateTdoc.aspx?mode=view&contributionId=716408 #. This would involve a new way for the device to attach to the network. Embedded SIM devices will have a device certificate for identifying and authenticating the device. This device certificate is used when authenticating to the SM-DP+/SM-DP.

Both the device, the radio access network nodes and the core network has to be modified in order to support the use of non-traditional identifiers (i.e., identifiers other than IMSI), such as certificates, for authenticating the device to the network.

Hence, there is still a need for improved mechanisms for enabling initial network access of a subscriber entity to a radio access network.

SUMMARY

An object of embodiments herein is to enable efficient initial network access of a subscriber entity to a radio access network.

According to a first aspect there is presented method for initial network access of a subscriber entity to a radio access network. The method is performed by the subscriber entity. The method comprises transmitting an attach message towards a network node. The attach message indicates a request for network access of the subscriber entity to a radio access network of the network node. The method comprises receiving an identification request originating from the network node. The identification request requests identification of the subscriber entity. The method comprises transmitting a response message towards the network node. The response message comprises an Access Identifier of the subscriber entity. The Access Identifier indicates that the subscriber entity is subscription-less. The method comprises receiving a grant from the network node. The grant allows the subscriber entity limited network access.

According to a second aspect there is presented a subscriber entity for initial network access of the subscriber entity to a radio access network. The subscriber entity comprises processing circuitry. The processing circuitry is configured to cause the subscriber entity to transmit an attach message towards a network node. The attach message indicates a request for network access of the subscriber entity to a radio access network of the network node. The processing circuitry is configured to cause the subscriber entity to receive an identification request originating from the network node. The identification request requests identification of the subscriber entity. The processing circuitry is configured to cause the subscriber entity to transmit a response message towards the network node. The response message comprises an Access Identifier of the subscriber entity. The Access Identifier indicates that the subscriber entity is subscription-less. The processing circuitry is configured to cause the subscriber entity to receive a grant from the network node. The grant allows the subscriber entity limited network access.

According to a third aspect there is presented a subscriber entity for initial network access of the subscriber entity to a radio access network. The subscriber entity comprises a transmit module configured to transmit an attach message towards a network node. The attach message indicates a request for network access of the subscriber entity to a radio access network of the network node. The subscriber entity comprises a receive module configured to receive an identification request originating from the network node. The identification request requests identification of the subscriber entity. The subscriber entity comprises a transmit module configured to transmit a response message towards the network node. The response message comprises an Access Identifier of the subscriber entity. The Access Identifier indicates that the subscriber entity is subscription-less. The subscriber entity comprises a receive module configured to receive a grant from the network node. The grant allows the subscriber entity limited network access.

According to a fourth aspect there is presented a computer program for initial network access of a subscriber entity to a radio access network. The computer program comprises computer program code which, when run on processing circuitry of a subscriber entity, causes the subscriber entity to perform a method according to the first aspect.

According to a fifth aspect there is presented method for allowing initial network access of a subscriber entity to a radio access network. The method is performed by a network node. The method comprises receiving an attach message originating from the subscriber entity. The method comprises transmitting an identification request towards the subscriber entity. The identification request requests identification of the subscriber entity. The method comprises receiving a response message from the subscriber entity. The response message comprises an Access Identifier of the subscriber entity. The Access Identifier indicates that the subscriber entity is subscription-less. The method comprises transmitting a grant towards the subscriber entity. The grant allows the subscriber entity limited network access.

According to a sixth aspect there is presented a network node for allowing initial network access of a subscriber entity to a radio access network. The network node comprises processing circuitry. The processing circuitry is configured to cause the network node to receive an attach message originating from the subscriber entity. The processing circuitry is configured to cause the network node to transmit an identification request towards the subscriber entity. The identification request requests identification of the subscriber entity. The processing circuitry is configured to cause the network node to receive a response message from the subscriber entity. The response message comprises an Access Identifier of the subscriber entity. The Access Identifier indicates that the subscriber entity is subscription-less. The processing circuitry is configured to cause the network node to transmit a grant towards the subscriber entity. The grant allows the subscriber entity limited network access.

According to a seventh aspect there is presented a network node for allowing initial network access of a subscriber entity to a radio access network. The network node comprises a receive module configured to receive an attach message originating from the subscriber entity. The network node comprises a transmit module configured to transmit an identification request towards the subscriber entity. The identification request requests identification of the subscriber entity. The network node comprises a receive module configured to receive a response message from the subscriber entity. The response message comprises an Access Identifier of the subscriber entity. The Access Identifier indicates that the subscriber entity is subscription-less. The network node comprises a transmit module configured to transmit a grant towards the subscriber entity. The grant allows the subscriber entity limited network access.

According to an eighth aspect there is presented a computer program for allowing initial network access of a subscriber entity to a radio access network. The computer program comprises computer program code which, when run on processing circuitry of a network node, causes the network node to perform a method according to the fifth aspect.

According to a ninth aspect there is presented a method for verification of a subscriber entity. The method is performed by a subscription portal entity. The method comprises obtaining an Access Identifier of the subscriber entity from a network node of a radio access network for which network access of the subscriber entity has been requested. The method comprises performing verification of the subscriber entity, wherein the Access Identifier received from the network node is used as reference by the subscription portal entity during the verification.

According to a tenth aspect there is presented a subscription portal entity for verification of a subscriber entity. The subscription portal entity comprises processing circuitry. The processing circuitry is configured to cause the subscription portal entity to obtain an Access Identifier of the subscriber entity from a network node of a radio access network for which network access of the subscriber entity has been requested. The processing circuitry is configured to cause the subscription portal entity to perform verification of the subscriber entity, wherein the Access Identifier received from the network node is used as reference by the subscription portal entity during the verification.

According to an eleventh aspect there is presented a subscription portal entity for verification of a subscriber entity. The subscription portal entity comprises an obtain module configured to obtain an Access Identifier of the subscriber entity from a network node of a radio access network for which network access of the subscriber entity has been requested. The subscription portal entity comprises a verification module configured to perform verification of the subscriber entity, wherein the Access Identifier received from the network node is used as reference by the subscription portal entity during the verification.

According to a twelfth aspect there is presented a computer program for verification of a subscriber entity, the computer program comprising computer program code which, when run on processing circuitry of a subscription portal entity, causes the subscription portal entity to perform a method according to the ninth aspect.

According to a thirteenth aspect there is presented a computer program product comprising a computer program according to at least one of the fourth aspect, the eighth aspect, and the twelfth aspect and a computer readable storage medium on which the computer program is stored. The computer readable storage medium can be a non-transitory computer readable storage medium.

Advantageously these methods, these subscriber entities, these network nodes, these subscription portal entities, and these computer programs provide efficient initial network access of the subscriber entity to a radio access network.

Advantageously these methods, these subscriber entities, these network nodes, these subscription portal entities, and these computer programs allow the subscriber entity (or its hosting terminal device) to use a cellular radio access network for ordering of a subscription. This means that the device does not need any other network access (e.g. Internet access using Wi-Fi) for this purpose. This reduces the cost of the device and potentially also its size as the additional circuitry needed for the other network access might be omitted.

Advantageously these methods, these subscriber entities, these network nodes, these subscription portal entities, and these computer programs removes the need to use an untrusted Wi-Fi network for the initial network access.

Advantageously these methods, these subscriber entities, these network nodes, these subscription portal entities, and these computer programs allows traditional IMSI based network access procedures to be used, but where the actual IMSI is replaced with the Access Identifier.

Advantageously these methods, these subscriber entities, these network nodes, these subscription portal entities, and these computer programs avoid the user of device certificates for authentication and initial network access, thereby not requiring only minor modification of the subscriber entity, the radio access network nodes and the core network in this respect.

Advantageously these methods, these subscriber entities, these network nodes, these subscription portal entities, and these computer programs enable the Access Identifier to be used not only for ordering of a subscription, but also to download a profile.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art.

Like numbers refer to like elements throughout the description. Any step or feature illustrated by dashed lines should be regarded as optional.

Figure 1:
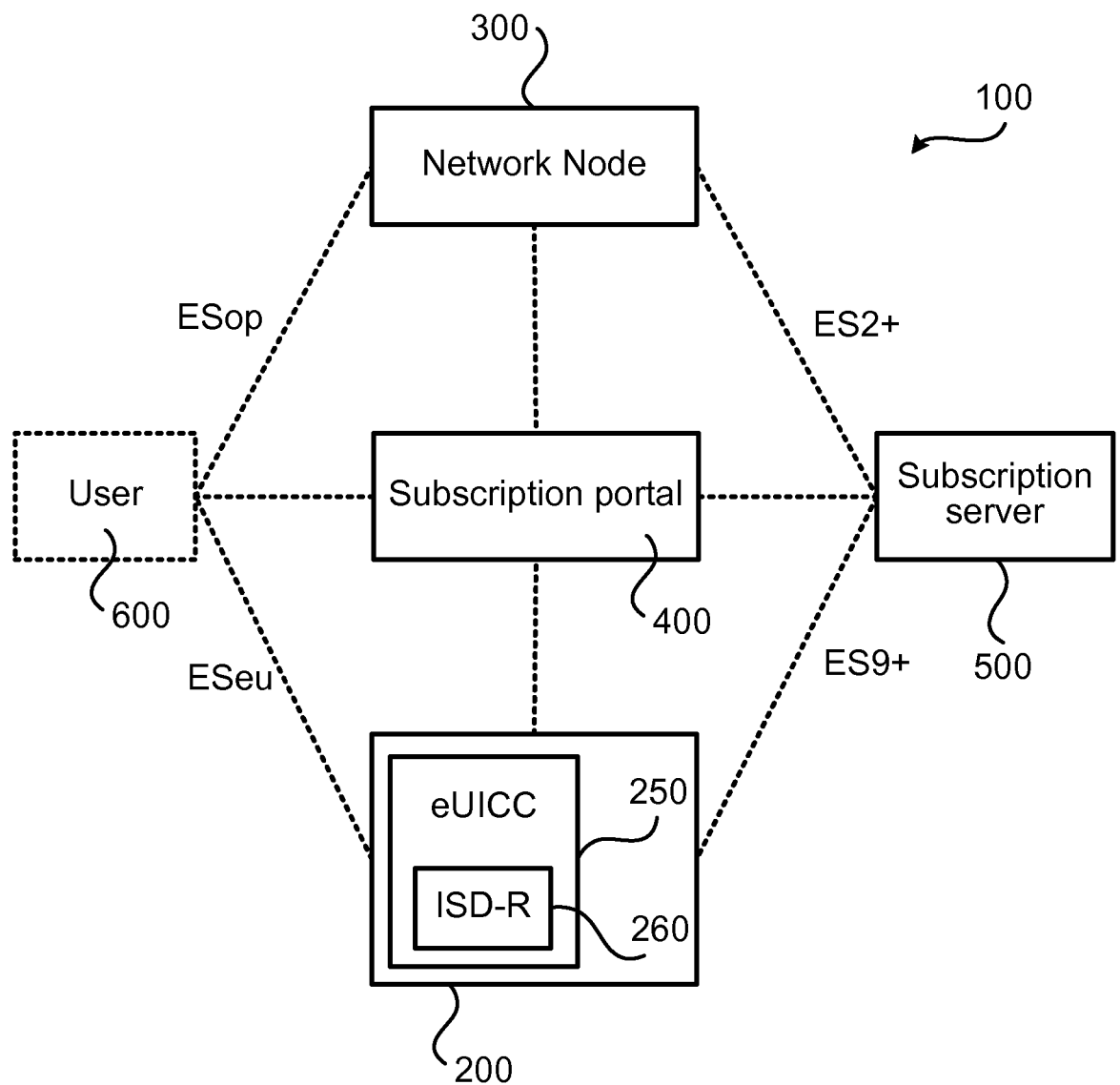
FIG. 1 is a schematic diagram illustrating a communications system according to embodiments.

FIG. 1 is a schematic diagram illustrating a communications system 100 where embodiments presented herein can be applied. The communications system 100 comprises a subscriber entity 200, a network node 300, a subscription portal entity 400, and a subscription server 500.

In some aspects, the subscriber entity 200 is an eSIM entity. The subscriber entity 200 generally comprises a profile handling unit, which could be provided as an Issuer Security Domain Root (ISD-R) function 260, or just ISD-R for short, and a remote subscription handling and storing unit, such as an Embedded Universal Integrated Circuit Card (eUICC) 250. According to some aspects the ISD-R is provided within the eUICC. Functions of an embedded SIM (eSIM, e-SIM, or virtual SIM) circuit could be part of the function of the eUICC. The subscriber entity 200 might be part of a terminal device, being either a consumer device (such as a mobile phone, modem, vessel, vehicle, or drone), or a machine-type communications (MTC) device (such as a sensor, or an Internet of Things device, etc.). The subscriber entity 200 is, via its hosting terminal device, typically capable of wireless communication.

In some aspects, the network node 300 is a mobility management entity (MME) node. In general terms, the network node 300 is a control node which processes signalling between the terminal device of the subscriber entity 200 and the Core Network (CN) and provides Visitor Location Register (VLR) functionality for the Evolved Packet System (EPS). It supports functions related to bearer and connection management.

In some aspects, the subscription portal entity 400 is an entity similar to an SM-DP+ entity. The subscription portal entity 400 might be implemented as a separate entity within the network of the network node 300 or as a service within the subscription server 500.

In some aspects, the subscription server 500 is an SM-DP+ server and/or an subscription manager-discovery service (SM-DS) server.

FIG. 1 further illustrates a user 600 which might interact with the subscriber entity 200, and the subscription portal entity 400.

As disclosed above there is a need for improved mechanisms for enabling initial network access of the subscriber entity 200 to a radio access network.

The embodiments disclosed herein thus relate to mechanisms for initial network access of a subscriber entity 200 to a radio access network, for allowing initial network access of the subscriber entity 200 to the radio access network, and for authentication of the subscriber entity 200. In order to obtain such mechanisms there is provided a subscriber entity 200, a method performed by the subscriber entity 200, a computer program product comprising code, for example in the form of a computer program, that when run on processing circuitry of the subscriber entity 200, causes the subscriber entity 200 to perform the method. In order to obtain such mechanisms there is further provided a network node 300, a method performed by the network node 300, and a computer program product comprising code, for example in the form of a computer program, that when run on processing circuitry of the network node 300, causes the network node 300 to perform the method. In order to obtain such mechanisms there is further provided a subscription portal entity 400, a method performed by the subscription portal entity 400, and a computer program product comprising code, for example in the form of a computer program, that when run on processing circuitry of the subscription portal entity 400, causes the subscription portal entity 400 to perform the method.

Figure 2:
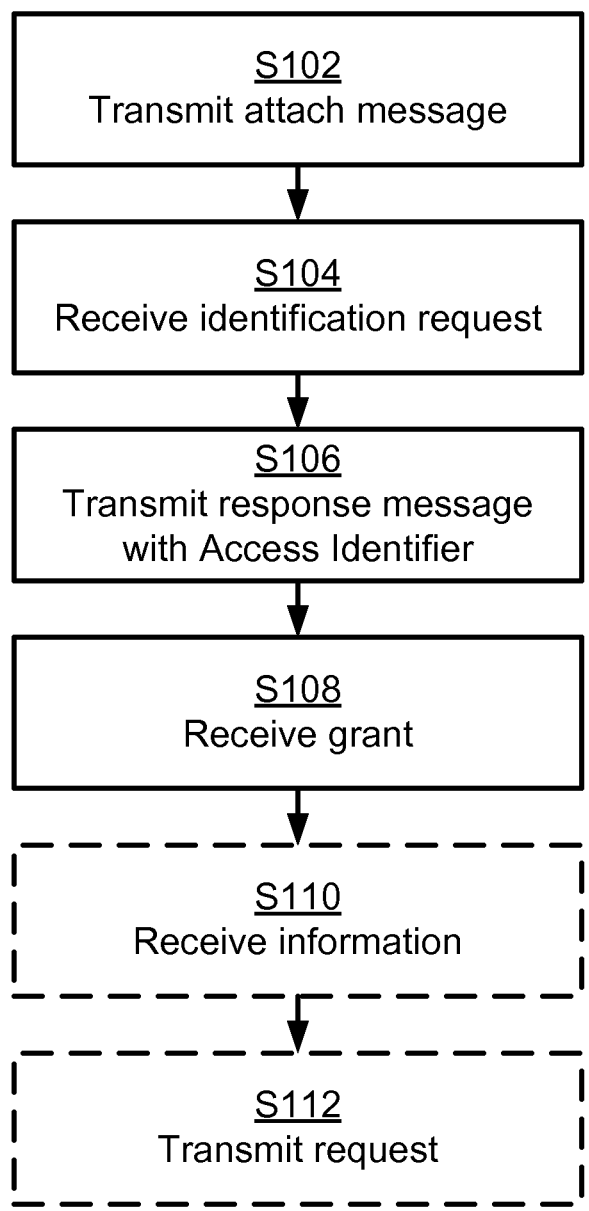
FIGS. 2, 3, and 4 are flowcharts of methods according to embodiments.

Reference is now made to FIG. 2 illustrating a method for initial network access of a subscriber entity 200 to a radio access network as performed by the subscriber entity 200 according to embodiments.

It is assumed that network access is requested for the subscriber entity 200. Hence, the subscriber entity 200 is configured to perform step S102:

S102: The subscriber entity 200 transmits an attach message towards a network node 300. The attach message indicates a request for network access of the subscriber entity 200 to a radio access network of the network node 300.

It is assumed that a network node 300 responds to the subscriber entity 200. Hence, the subscriber entity 200 is configured to perform step S104:

S104: The subscriber entity 200 receives an identification request originating from the network node 300. The identification request requests identification of the subscriber entity 200.

The herein disclosed embodiments are based on the subscriber entity 200 using an Access Identifier (instead of device credentials, IMSI, etc.) for at least gaining limited network access, for example, to a cellular radio access network. Hence, the subscriber entity 200 is configured to perform step S106:

S106: The subscriber entity 200 transmits a response message towards the network node 300. The response message comprises an Access Identifier of the subscriber entity 200. The Access Identifier indicates that the subscriber entity 200 is subscription-less.

Upon receiving this Access Identifier, the network node 300 will immediately allow network access, however perhaps only to a restricted set of services. Hence, the subscriber entity 200 is configured to perform step S108:

S108: The subscriber entity 200 receives a grant from the network node 300. The grant allows the subscriber entity 200 limited network access.

Embodiments relating to further details of initial network access of the subscriber entity 200 to the radio access network as performed by the subscriber entity 200 will now be disclosed.

As will be further disclosed below, there may be different types of network access granted for the subscriber entity 200. Particularly, according to an embodiment, the grant allows the subscriber entity 200 limited network access to a subscription portal entity 400.

In some aspects, the network node 300 provides an address of the subscription ordering portal entity 400 to the subscriber entity 200. Particularly, according to an embodiment, the grant comprises a network address of the subscription portal entity 400.

In some aspects, the address of the subscription ordering portal entity 400 is sent by the network node 300 as part of network configuration or as part of resource discovery. Particularly, according to an embodiment, the subscriber entity 200 is configured to perform (optional) step S110:

S110: The subscriber entity 200 receives network configuration information and/or resource discovery information originating from the network node 300. The network configuration information and/or resource discovery information comprises a network address of the subscription portal entity 400.

One of the services the network node 300 might allow the subscriber entity 200 to access is ordering of a subscription. In some aspects, the subscriber entity 200 thus visits the subscription management portal entity 400 and performs (mutual) authentication with the subscription portal entity 400 using the Access Identifier. Particularly, according to an embodiment, the subscriber entity 200 is configured to perform (optional) step S112:

S112: The subscriber entity 200 transmits a request for generation of a subscription profile for the subscriber entity 200 towards the subscription portal entity 400.

The subscriber entity 200 might then, still using the Access Identifier, be involved in any of steps S408, S410, S411, S412 as disclosed below in order to download and install a subscription profile.

In some aspects, the Access Identifier is verified by the subscription management portal entity 400 computing its own hash of an EID of the subscriber entity 200 and using it as reference. Particularly, according to an embodiment, the request for generation of the subscription profile comprises identity information of the subscriber entity 200, and the subscriber entity 200 is authenticated by the subscription portal entity 400 based on the identity information.

In further detail, (mutual) authentication might be used to verify that the subscriber entity 200 is operatively connected to the correct network node 300. This might, for example, be achieved by using a HTTPS connection with only server side certificate. To validate the subscriber entity 200, and thus provide mutual authentication, the eUICC certificate can be used. The trust anchor for the subscriber entity 200 to verify the server certificate can be achieved in multiple ways. One example implementation way is that the mobile network operator delivers the subscription portal entity 400 as a service under the SM-DP+ service (potentially owned by the mobile network operator). As there is already trust anchor established between the SM-DP+ and the device by GSMA root CA certificates, no other trust anchor is needed.

There could be different ways for the subscriber entity 200 to select towards which network node 300 the attach message is to be transmitted. In some aspects, the network node 300 is selected by means of configuration. The configuration could either be defined by user input or be pre-set in the subscriber entity 200 and/or be based on a selection policy. Particularly, according to an embodiment, towards which network node 300 the attach message is transmitted towards is based on configuration information.

Figure 3:
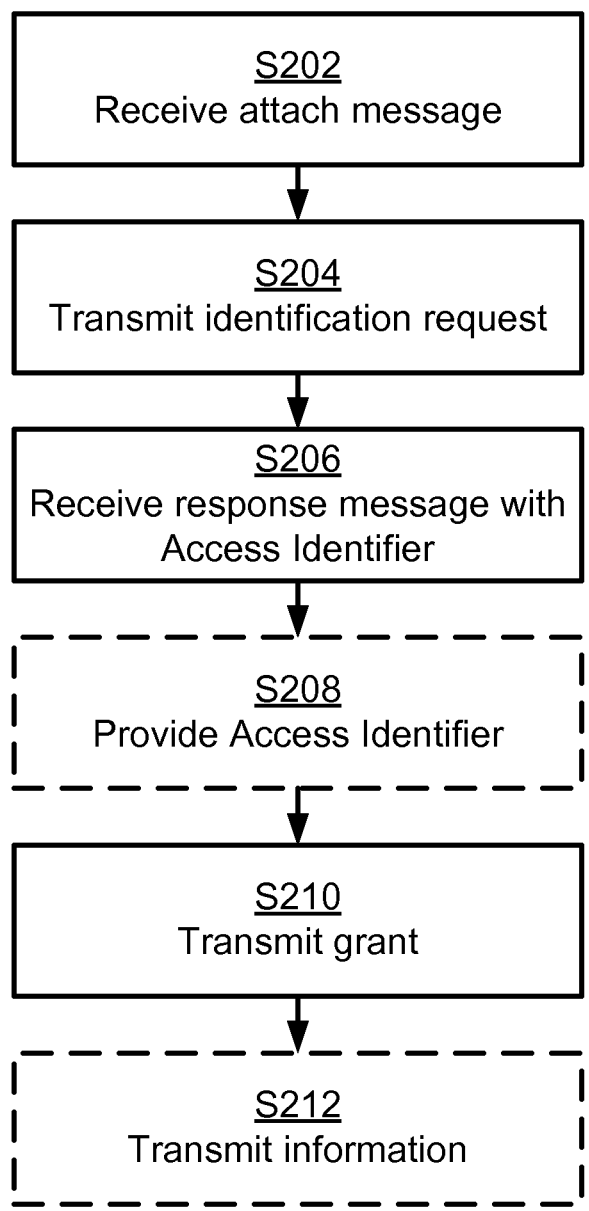

Reference is now made to FIG. 3 illustrating a method for allowing initial network access of a subscriber entity 200 to a radio access network as performed by the network node 300 according to embodiments.

S202: The network node 300 receives an attach message. The attach message originates from the subscriber entity 200.

S204: The network node 300 transmits an identification request towards the subscriber entity 200. The identification request requests identification of the subscriber entity 200.

S206: The network node 300 receives a response message from the subscriber entity 200. The response message comprises an Access Identifier of the subscriber entity 200. The Access Identifier indicates that the subscriber entity 200 is subscription-less; and S210: The network node 300 transmits a grant towards the subscriber entity 200. The grant allows the subscriber entity 200 limited network access.

Embodiments relating to further details of allowing initial network access of the subscriber entity 200 to the radio access network as performed by the network node 300 will now be disclosed.

As disclosed above, according to an embodiment, the grant allows the subscriber entity 200 limited network access to a subscription portal entity 400.

In some aspects, when the network node 300 identifies the Access Identifier as not a regular IMSI it might bypass further authentication of the subscriber entity 200. Particularly, according to an embodiment, the grant is transmitted without the network node 300 having authenticated the subscriber entity 200.

In some aspects, the network node 300 makes the Access Identifier available to the subscription portal entity 400. Particularly, according to an embodiment, the network node 300 is configured to perform (optional) step S208:

S208: The network node 300 provides the Access Identifier to the subscription portal entity 400.

As disclosed above, in some aspects, the network node 300 provides the address of the subscription ordering portal entity 400 to the subscriber entity 200. Particularly, according to an embodiment, the grant comprises a network address of the subscription portal entity 400.

As disclosed above, in some aspects, the address of the subscription ordering portal entity 400 is sent by the network node 300 as part of network configuration or as part of resource discovery. Particularly, according to an embodiment, the network node 300 is configured to perform (optional) step S212:

S212: The network node 300 transmits network configuration information and/or resource discovery information towards the subscriber entity 200. The network configuration information and/or resource discovery information comprises a network address of the subscription portal entity 400.

Figure 4:
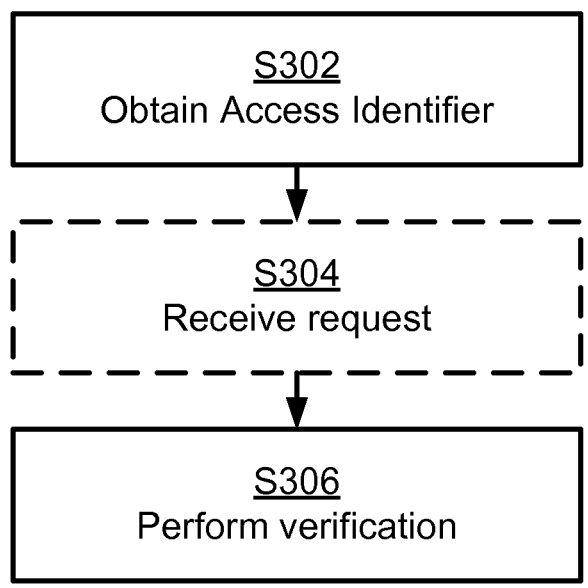

Reference is now made to FIG. 4 illustrating a method for verification of a subscriber entity 200 as performed by the subscription portal entity 400 according to embodiments.

S302: The subscription portal entity 400 obtains an Access Identifier of the subscriber entity 200 from a network node 300 of a radio access network for which network access of the subscriber entity 200 has been requested.

S306: The subscription portal entity 400 performs verification of the subscriber entity 200. The Access Identifier received from the network node 300 is used as reference by the subscription portal entity 400 during the verification.

Embodiments relating to further details of authentication of the subscriber entity 200 as performed by the subscription portal entity 400 will now be disclosed.

As disclosed above, in some aspects, the subscriber entity 200 visits the subscription management portal entity 400. Particularly, according to an embodiment, subscription portal entity 400 is configured to perform (optional) step S304:

S304: The subscription portal entity 400 receives a request for generation of a subscription profile for the subscriber entity 200. The request originates from the subscriber entity 200.

In this respect the actual subscription profile might have already been generated by the subscription portal entity 400 when it receives the request in step S304.

In some aspects, the verification and (optional) authentication is performed in response to the request for subscription profile generation. Particularly, according to an embodiment, the verification of the subscriber entity 200 is performed upon receiving the request.

In general terms, verification is performed to only allow subscriber entities that the mobile network operator has allowed access for to connect to the subscription portal entity 400, while authentication is preformed to verify the actual identity of the subscriber entity 200 requesting the subscription profile.

In general terms, the Access Identifier is verified by the subscription portal entity 400 once the subscriber entity 200 connects to it, but the identity of the subscriber entity 200 might (optionally) be authenticated by the subscription portal entity 400 before the subscription portal entity 400 allows the subscriber entity 200 to order the subscription profile.

In some aspects, the subscription portal entity 400 performs the verification by deriving its own Access Identifier and compares it to the Access Identifier received from the network node 300. Particularly, according to an embodiment, the Access Identifier received from the network node 300 is compared to an Access Identifier as generated by the subscription portal entity 400 based on parameters received from the subscriber entity 200 in conjunction with the request.

There could be different types of network access granted for the subscriber entity 200.

In some aspects, the network access is limited to all steps leading up to, and including, download of subscription profile to the subscriber entity 200. Particularly, according to an embodiment, the network access of the subscriber entity 200 is limited to actions needed to be performed by the subscriber entity 200 for subscription profile download.

There could be different types of networks to which the network access is granted. In some aspects, the network access is granted to a network using a cellular radio access technology. Particularly, according to an embodiment, a cellular radio access technology is used for the network access of the subscriber entity 200.

There could be different types of Access Identifiers.

According to an embodiment, the Access Identifier is based on a hash of identity information, such as EID, of the subscriber entity 200.

In further detail, to generate the Access Identifier, the subscriber entity 200, or the profile handling unit (e.g. eUICC or iUICC) of the subscriber entity 200, determines a hash of the EID of the subscriber entity 200. The hash (or another One Way Function) of the EID might be used instead of the plain EID to reduce the size of the Access Identifier in a securely linkable way to a size that fits into the IMSI size requirement.

According to an embodiment, the Access Identifier is random valued.

In further detail, the Access Identifier could be fully randomized instead of relying on the EID. This might cause some identification capabilities to be lost since the EID, or hash of it, is an identifier that can be authenticated and verified whereas a fully randomized Access Identifier can be verified but not authenticated.

According to an embodiment, the Access Identifier is based on a hash of identity information of the subscriber entity 200 and on at least one random number.

In further detail, the hash could be generated as a combination of EID and a random number R. Now, if there is a verification of the hashed part at the subscription portal entity 400 (such as in conjunction with above step S306), then the subscriber entity 200 will need to send this random value R along with the EID to the subscription portal entity 400 so that the subscription portal entity 400 can calculate the same hash value. This formation of the Access Identifier brings additional advantages. Firstly, the subscriber entity 200 will be able to generate a unique Access Identifier every time for the initial connectivity request. This will give a sort of privacy protection for the Access Identifier. Secondly, the Access Identifier will not be directly traceable in the network (but only through the subscription portal entity 400) as it is new every time. Therefore, the mobile network operator will not be able to block any specific Access Identifier from getting an initial connectivity.

According to an embodiment, the Access Identifier has a prefix indicating that the Access Identifier is not a regular IMSI.

In further detail, any of the above disclosed types of Access Identifiers (hash of identity information, random valued, or hash of identity information and at least one random number) could be appended to a pre-known special prefix. A non-limiting example of such a prefix is "00000". Therefore, the Access Identifier might have the form: Access Identifier=prefix+hash(identity information), or Access Identifier=prefix+random number, or Access Identifier=prefix+hash(identity information, at least one random number), where hash(z) denotes the hash of the parameter z, and where "x+y" denotes appending the string y to the string x.

Further, the length of the Access Identifier might equal the length of a regular IMSI.

Figure 5:
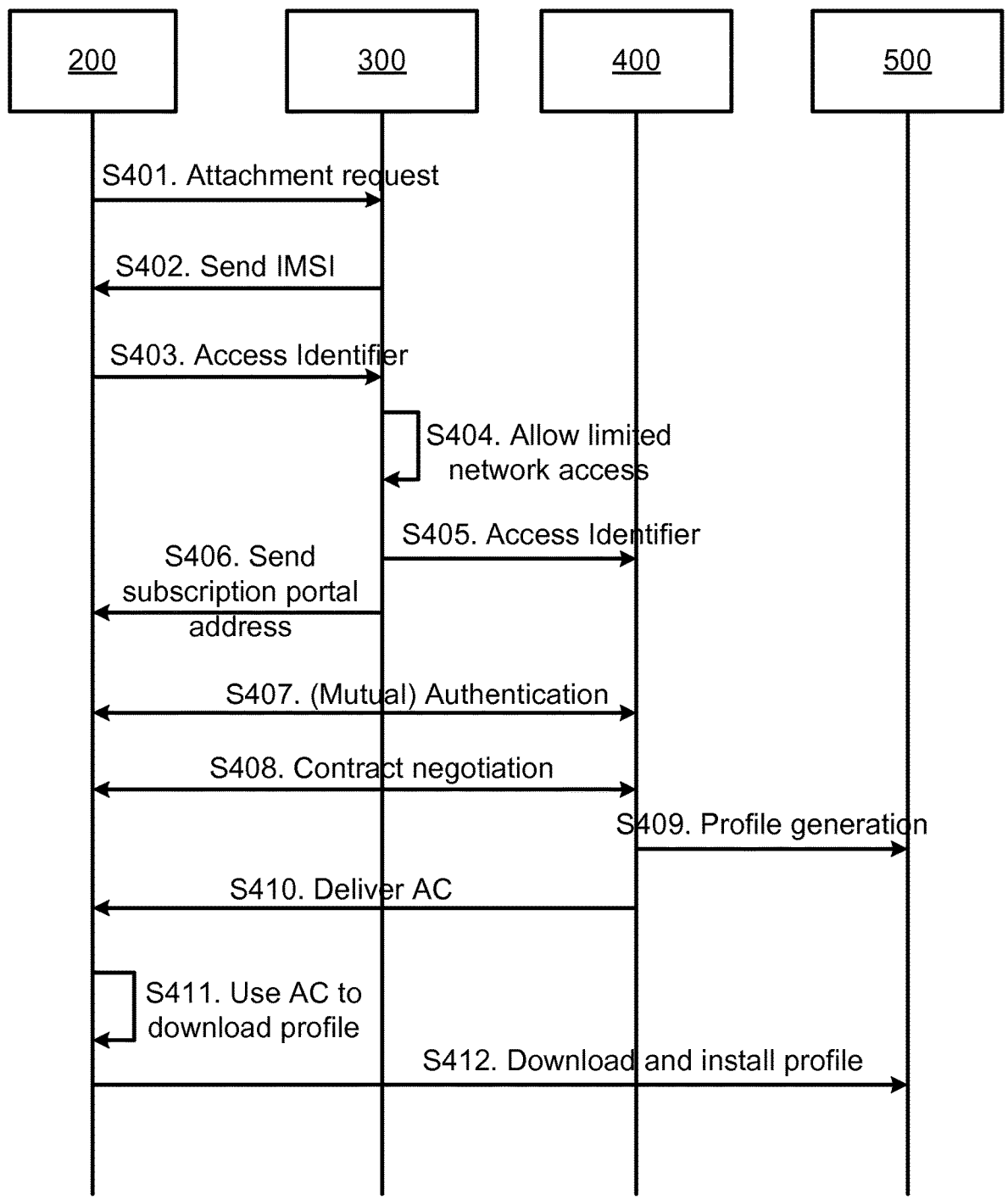
FIG. 5 is a signalling diagram of a method according to an embodiment.

One particular embodiment based on at least some of the above disclosed embodiments will now be disclosed in detail with reference to the signalling diagram of FIG. 5.

Particularly, FIG. 5 is a signalling diagram for a subscriber entity 200 to initiate a temporary connection, and then using this connection to order a subscription and later to download a subscription profile. It is assumed that the subscriber entity 200 searches for available networks or mobile network operators and selects a network or mobile network operator based on user input, selection policy, pre-set information, or other information such as seen signal strength of available cellular radio access networks, etc. Networks or mobile network operators could in the device be provided in a list of networks or mobile network operators in preferred order.

S401: The subscriber entity 200 sends an attach request to a network node 300 of the selected network or mobile network operator.

S402: The network node 300 requests for identification of the network subscription of the subscriber entity 200.

S403: The subscriber entity 200 does not yet have any network subscription and therefore sends the Access Identifier in response to the identification request.

S404: The network node 300 having identified the Access Identifier as not being a regular IMSI bypasses authentication and grants limited network access, at least for the subscriber entity 200 to establish an operative connection to the subscription portal entity 400.

S405: The network node 300 provides the Access Identifier to the subscription portal entity 400.

S406: The network node 300 having allowed network access for the subscriber entity 200 provides an acknowledgement to the subscriber entity 200 that the connection request is granted. The network node 300 optionally provides the address of the subscription ordering portal entity 400 from where the subscriber entity 200 can order a network subscription. The address of the subscription portal entity 400 might also be sent by a radio access network node or the network node 300 as part of network configuration or as part of resource discovery.

S407: The subscriber entity 200 visits the subscription portal entity 400 of the selected mobile network operator and performs (mutual) authentication with the subscription portal entity 400 using its EID and associated certificate and mobile network operator certificate. An example process for (mutual) authentication is described above.

S408: (optional) The subscriber entity 200, after (mutual) authentication, performs contract negotiation with the subscription portal entity 400 for a network subscription. User input might be used in order for the subscriber entity 200 to specify what kind of network subscription is to be selected. User input might be used in order for the subscriber entity 200 to provide necessary information, such as personal identity, billing information, etc. to the subscription portal entity 400.

S409: (optional) The subscription portal entity 400 requests the subscription server 500 to generate a subscription profile using the information received in step S408. Alternatively, the subscription profile is generated before step S408 and is in step S409 selected from a pool of subscription profiles using the information received in step S408.

S410: (optional) The subscription portal entity 400 provides the subscriber entity 200, or its user, with the activation code (AC) for the subscription profile.

S411: (optional) The subscriber entity 200 initiates download of the subscription profile by applying the AC directly, or by first obtaining the AC as user input.

S412: The subscriber entity 200 uses the AC to download the subscription profile from the subscription server 500. This access to the subscription server 500 is also allowed using the initial connectivity set up using the Access Identifier. The subscriber entity 200 now has a proper subscription profile which it can use for gaining full network access. Alternatively, the subscription profile is downloaded from the subscription portal entity 400.

Steps S410 and S411 are optional when there is a possibility for the subscriber entity 200 to download the subscription profile without using an AC.

Further, steps S408, S409, S410 and S411 are optional when the subscriber entity 200 lacks user interface and where the subscription profile has already been generated by the subscription server 500.

The subscriber entity 200 could use the selection policy, pre-set information, or other information to select the network or mobile network operator for example in scenarios where the subscriber entity 200 does not have a suitable user interface. The selection policy could be configured by e.g. the user, if there is a suitable user interface for it, but typically it would be set by the manufacturer for helping the subscriber entity 200 to bootstrap connectivity for itself. The selection policy might be such that the user can easily know which network or mobile network operator the subscriber entity 200 will attach to, which e.g. would be the case with an ordered list of preferred network or mobile network operator or when selecting network or mobile network operator according to alphabetical order. In this way the user will know to which subscription portal entity 400 to (optionally) provision the device identities and billing information beforehand. The subscription portal entity 400 might then, after successful authentication of the subscriber entity 200, just provide the subscription profile without requesting for any user or billing information. In this way, the subscriber entity 200 can be deployed anywhere without any further needed user interaction. For example, the subscriber entity 200 might select one network or mobile network operator based on some selection policy (e.g. alphabetical order) and once the subscriber entity 200 has global connectivity through the selected network or mobile network operator, the user can configure the actual preferred network or mobile network operator and the subscriber entity 200 then gets a new subscription profile for the preferred network or mobile network operator. In further detail, the user might remotely configure the subscriber entity 200 to obtain a new profile from an indicated mobile network operator and/or subscription portal entity 400. This configuration might be performed using a device management portal or by directly connecting to the subscriber entity. Alternatively, the user might order the profile from the mobile network operator, and the information that the profile is available would be recorded in the subscription server 500 from where the subscriber entity 200 will be informed that it has a new profile to fetch.

Further, when the subscriber entity 200 uses a static selection policy for initial (or later on using selection policy based) profile download, the subscriber entity 200 might request a subscription profile with a pay by byte count subscription that can be terminated quickly so that the thus policy-selected subscription profile can be terminated as soon as the user has configured the subscriber entity 200 to download the actual preferred subscription profile from the preferred mobile network operator, without incurring much cost for using the initially selected network or mobile network operator.

Figure 6:
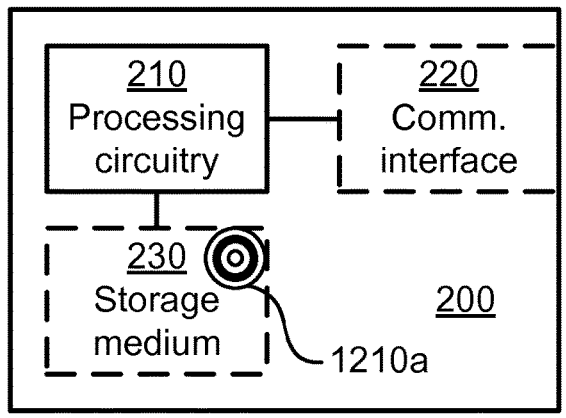
FIG. 6 is a schematic diagram showing functional units of a subscriber entity according to an embodiment.

FIG. 6 schematically illustrates, in terms of a number of functional units, the components of a subscriber entity 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1210*a* (as in FIG. 12), e.g. in the form of a storage medium 230. The processing circuitry 210 may further be provided as at least one application specific integrated circuit (ASIC), or field programmable gate array (FPGA).

Particularly, the processing circuitry 210 is configured to cause the subscriber entity 200 to perform a set of operations, or steps, S102-S112, as disclosed above. For example, the storage medium 230 may store the set of operations, and the processing circuitry 210 may be configured to retrieve the set of operations from the storage medium 230 to cause the subscriber entity 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The subscriber entity 200 may further comprise a communications interface 220 for communications with other entities, functions, nodes, and devices of the communications system 100. As such the communications interface 220 may comprise one or more transmitters and receivers, comprising analogue and digital components. The communications interface 220 might further be configured to user interaction and thus implement the functionality of a user interface.

The processing circuitry 210 controls the general operation of the subscriber entity 200 e.g. by sending data and control signals to the communications interface 220 and the storage medium 230, by receiving data and reports from the communications interface 220, and by retrieving data and instructions from the storage medium 230. Other components, as well as the related functionality, of the subscriber entity 200 are omitted in order not to obscure the concepts presented herein.

Figure 7:
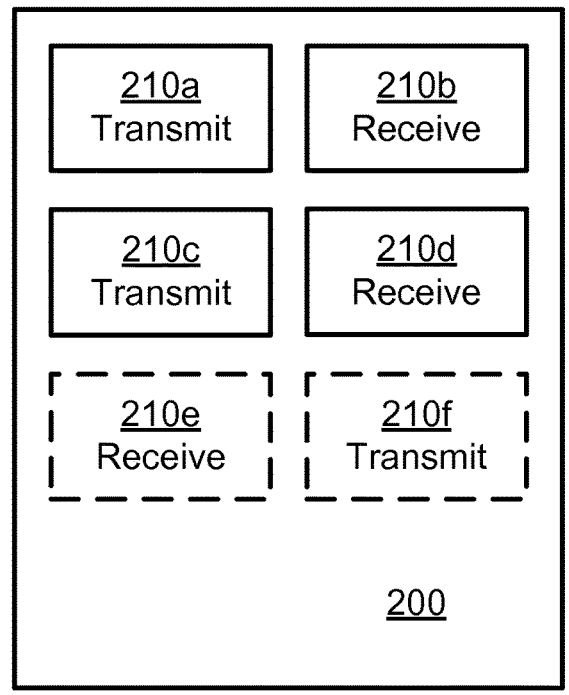
FIG. 7 is a schematic diagram showing functional modules of a subscriber entity according to an embodiment.

FIG. 7 schematically illustrates, in terms of a number of functional modules, the components of a subscriber entity 200 according to an embodiment. The subscriber entity 200 of FIG. 7 comprises a number of functional modules; a transmit module 210*a* configured to perform step S102, a receive module 210 *b* configured to perform step S104, a transmit module 210*c* configured to perform step S106, and a receive module 210*d* configured to perform step S108. The subscriber entity 200 of FIG. 7 may further comprise a number of optional functional modules, such as any of a receive module 210*e* configured to perform step S110, and a transmit module 210*f* configured to perform step S112. In general terms, each functional module 210*a*-210*f* may be implemented in hardware or in software. Preferably, one or more or all functional modules 210*a*-210*f* may be implemented by the processing circuitry 210, possibly in cooperation with the communications interface 220 and the storage medium 230. The processing circuitry 210 may thus be arranged to from the storage medium 230 fetch instructions as provided by a functional module 210*a*-210*f* and to execute these instructions, thereby performing any steps of the subscriber entity 200 as disclosed herein.

The subscriber entity 200 may be provided as a standalone device or as a part of at least one further device. For example, as disclosed above, the subscriber entity 200 might be an eSIM. As further disclosed above, the subscriber entity 200 might be part of a terminal device, being either a consumer device (such as a mobile phone, modem, vessel, vehicle, or drone), or a machine-type communications (MTC) device (such as a sensor, or an Internet of Things device, etc.). Although a single processing circuitry 210 is illustrated in FIG. 6 the processing circuitry 210 may be distributed among a plurality of devices, or nodes. The same applies to the functional modules 210*a*-210*f* of FIG. 7 and the computer program 1220*a* of FIG. 12 (see below).

Figure 8:
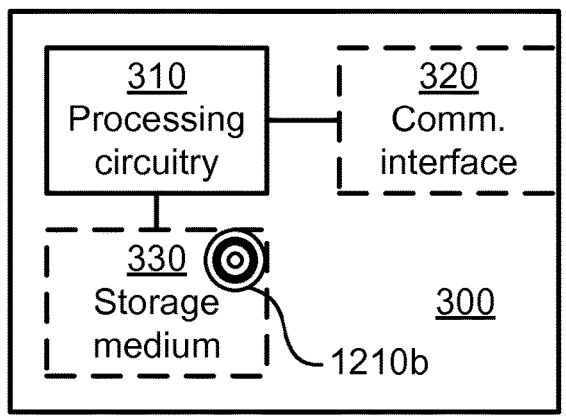
FIG. 8 is a schematic diagram showing functional units of a network node according to an embodiment.

FIG. 8 schematically illustrates, in terms of a number of functional units, the components of a network node 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1210*b* (as in FIG. 12), e.g. in the form of a storage medium 330. The processing circuitry 310 may further be provided as at least one application specific integrated circuit (ASIC), or field programmable gate array (FPGA).

Particularly, the processing circuitry 310 is configured to cause the network node 300 to perform a set of operations, or steps, S202-S212, as disclosed above. For example, the storage medium 330 may store the set of operations, and the processing circuitry 310 may be configured to retrieve the set of operations from the storage medium 330 to cause the network node 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The network node 300 may further comprise a communications interface 320 for communications with other entities, functions, nodes, and devices of the communications system 100.

As such the communications interface 320 may comprise one or more transmitters and receivers, comprising analogue and digital components.

The processing circuitry 310 controls the general operation of the network node 300 e.g. by sending data and control signals to the communications interface 320 and the storage medium 330, by receiving data and reports from the communications interface 320, and by retrieving data and instructions from the storage medium 330. Other components, as well as the related functionality, of the network node 300 are omitted in order not to obscure the concepts presented herein.

Figure 9:
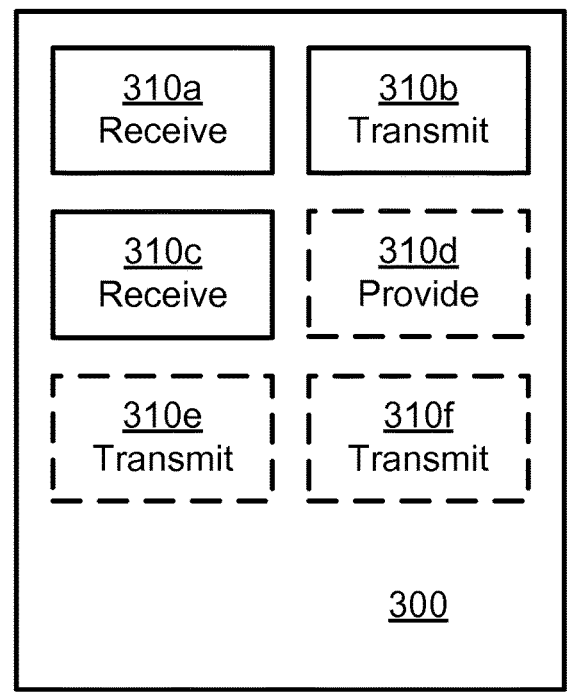
FIG. 9 is a schematic diagram showing functional modules of a network node according to an embodiment.

FIG. 9 schematically illustrates, in terms of a number of functional modules, the components of a network node 300 according to an embodiment. The network node 300 of FIG. 9 comprises a number of functional modules; a receive module 310a configured to perform step S202, a transmit module 310b configured to perform step S204, a receive module 310c configured to perform step S206 and a transmit module 310e configured to perform step S210. The network node 300 of FIG. 9 may further comprise a number of optional functional modules, such as any of a provide module 310d configured to perform step S208 and a transmit module 310e configured to perform step S210. In general terms, each functional module 310a-310f may be implemented in hardware or in software. Preferably, one or more or all functional modules 310a-310f may be implemented by the processing circuitry 310, possibly in cooperation with the communications interface 320 and the storage medium 330. The processing circuitry 310 may thus be arranged to from the storage medium 330 fetch instructions as provided by a functional module 310a-310f and to execute these instructions, thereby performing any steps of the network node 300 as disclosed herein.

The network node 300 may be provided as a standalone device or as a part of at least one further device. For example, the network node 300 may be provided in a node of a radio access network or in a node of a core network. As disclosed above, in some aspects, the network node 300 is an MME node and thus located in the core network. Alternatively, functionality of the network node 300 may be distributed between at least two devices, or nodes. These at least two nodes, or devices, may either be part of the same network part (such as the radio access network or the core network) or may be spread between at least two such network parts.

Thus, a first portion of the instructions performed by the network node 300 may be executed in a first device, and a second portion of the of the instructions performed by the network node 300 may be executed in a second device; the herein disclosed embodiments are not limited to any particular number of devices on which the instructions performed by the network node 300 may be executed. Hence, the methods according to the herein disclosed embodiments are suitable to be performed by a network node 300 residing in a cloud computational environment. Therefore, although a single processing circuitry 310 is illustrated in FIG. 8 the processing circuitry 310 may be distributed among a plurality of devices, or nodes. The same applies to the functional modules 310a-310f of FIG. 9 and the computer program 1220b of FIG. 12 (see below).

Figure 10:
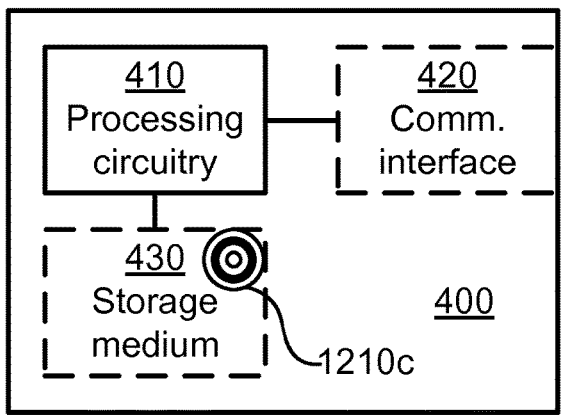
FIG. 10 is a schematic diagram showing functional units of a subscription portal entity according to an embodiment.

FIG. 10 schematically illustrates, in terms of a number of functional units, the components of a subscription portal entity 400 according to an embodiment. Processing circuitry 410 is provided using any combination of one or more of a suitable central processing unit (CPU), multiprocessor, microcontroller, digital signal processor (DSP), etc., capable of executing software instructions stored in a computer program product 1210c (as in FIG. 12), e.g. in the form of a storage medium 430. The processing circuitry 410 may further be provided as at least one application specific integrated circuit (ASIC), or field programmable gate array (FPGA).

Particularly, the processing circuitry 410 is configured to cause the subscription portal entity 400 to perform a set of operations, or steps, S302-S306, as disclosed above. For example, the storage medium 430 may store the set of operations, and the processing circuitry 410 may be configured to retrieve the set of operations from the storage medium 430 to cause the subscription portal entity 400 to perform the set of operations. The set of operations may be provided as a set of executable instructions. Thus the processing circuitry 410 is thereby arranged to execute methods as herein disclosed.

The storage medium 430 may also comprise persistent storage, which, for example, can be any single one or combination of magnetic memory, optical memory, solid state memory or even remotely mounted memory.

The subscription portal entity 400 may further comprise a communications interface 420 for communications with other entities, functions, nodes, and devices of the communications system 100. As such the communications interface 420 may comprise one or more transmitters and receivers, comprising analogue and digital components.

The processing circuitry 410 controls the general operation of the subscription portal entity 400 e.g. by sending data and control signals to the communications interface 420 and the storage medium 430, by receiving data and reports from the communications interface 420, and by retrieving data and instructions from the storage medium 430. Other components, as well as the related functionality, of the subscription portal entity 400 are omitted in order not to obscure the concepts presented herein.

Figure 11:
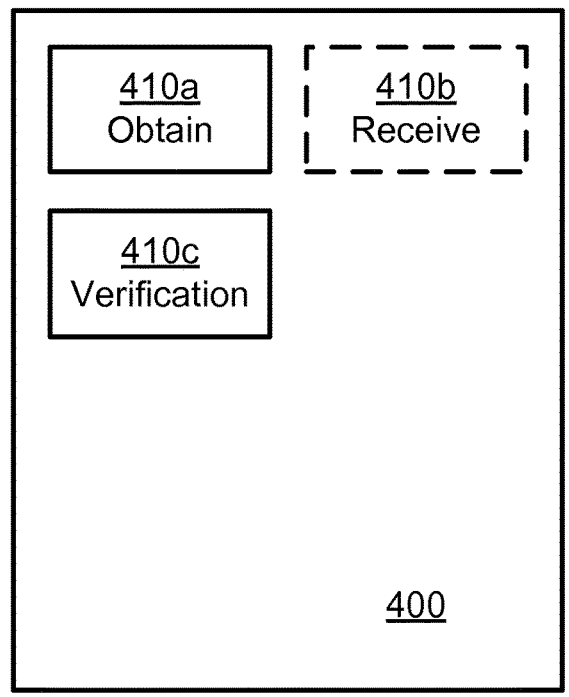
FIG. 11 is a schematic diagram showing functional modules of a subscription portal entity according to an embodiment.

FIG. 11 schematically illustrates, in terms of a number of functional modules, the components of a subscription portal entity 400 according to an embodiment. The subscription portal entity 400 of FIG. 11 comprises a number of functional modules; an obtain module 410a configured to perform step S302, and a verification module 410c configured to perform step S306. The subscription portal entity 400 of FIG. 11 may further comprise a number of optional functional modules, such as a receive module 410b configured to perform step S304. In general terms, each functional module 410a-410c may be implemented in hardware or in software. Preferably, one or more or all functional modules 410a-410c may be implemented by the processing circuitry 410, possibly in cooperation with the communications interface 420 and the storage medium 430. The processing circuitry 410 may thus be arranged to from the storage medium 430 fetch instructions as provided by a functional module 410a-410c and to execute these instructions, thereby performing any steps of the subscription portal entity 400 as disclosed herein.

The subscription portal entity 400 may be provided as a standalone device or as a part of at least one further device. For example, the subscription portal entity 400 may be provided in a node of a radio access network or in a node of a core network or even in a node of a service network. Alternatively, functionality of the subscription portal entity 400 may be distributed between at least two devices, or nodes. These at least two nodes, or devices, may either be part of the same network part (such as the radio access network or the core network or the service network) or may be spread between at least two such network parts.

Thus, a first portion of the instructions performed by the subscription portal entity 400 may be executed in a first device, and a second portion of the of the instructions performed by the subscription portal entity 400 may be executed in a second device; the herein disclosed embodiments are not limited to any particular number of devices on which the instructions performed by the subscription portal entity 400 may be executed. Hence, the methods according to the herein disclosed embodiments are suitable to be performed by a subscription portal entity 400 residing in a cloud computational environment. Therefore, although a single processing circuitry 310 is illustrated in FIG. 10 the processing circuitry 410 may be distributed among a plurality of devices, or nodes. The same applies to the functional modules 410a-410c of FIG. 11 and the computer program 1220c of FIG. 12 (see below).

Figure 12:
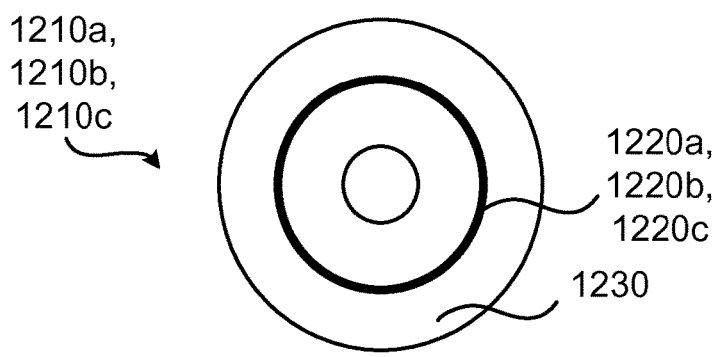
FIG. 12 shows one example of a computer program product comprising computer readable means according to an embodiment.

FIG. 12 shows one example of a computer program product 1210a, 1210b, 1210c comprising computer readable means 1230. On this computer readable means 1230, a computer program 1220a can be stored, which computer program 1220a can cause the processing circuitry 210 and thereto operatively coupled entities and devices, such as the communications interface 220 and the storage medium 230, to execute methods according to embodiments described herein. The computer program 1220a and/or computer program product 1210a may thus provide means for performing any steps of the subscriber entity 200 as herein disclosed. On this computer readable means 1230, a computer program 1220b can be stored, which computer program 1220b can cause the processing circuitry 310 and thereto operatively coupled entities and devices, such as the communications interface 320 and the storage medium 330, to execute methods according to embodiments described herein. The computer program 1220b and/or computer program product 1210b may thus provide means for performing any steps of the network node 300 as herein disclosed. On this computer readable means 1230, a computer program 1220c can be stored, which computer program 1220c can cause the processing circuitry 410 and thereto operatively coupled entities and devices, such as the communications interface 420 and the storage medium 430, to execute methods according to embodiments described herein. The computer program 1220c and/or computer program product 1210c may thus provide means for performing any steps of the subscription portal entity 400 as herein disclosed.

In the example of FIG. 12, the computer program product 1210a, 1210b, 1210c is illustrated as an optical disc, such as a CD (compact disc) or a DVD (digital versatile disc) or a Blu-Ray disc. The computer program product 1210a, 1210b, 1210c could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1220a, 1220b, 1220c is here schematically shown as a track on the depicted optical disk, the computer program 1220a, 1220b, 1220c can be stored in any way which is suitable for the computer program product 1210a, 1210b, 1210c.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for initial network access of a subscriber entity to a radio access network, the method being performed by the subscriber entity, the method comprising:
   transmitting an attach message towards a network node, the attach message indicating a request for network access of the subscriber entity to a radio access network of the network node;
   receiving an identification request originating from the network node, the identification request requesting identification of the subscriber entity;
   generating a hash value by inputting into a hash function a string that comprises an electronic identifier for the subscriber entity;
   generating an access identifier using the hash value, wherein the generated access identifier comprises the generated hash value;
   transmitting towards the network node a response message responsive to the identification request, the response message comprising the generated access identifier that comprises the generated hash value, the access identifier indicating that the subscriber entity is subscription-less; and
   receiving a grant from the network node, the grant allowing the subscriber entity limited network access, wherein
   the access identifier further comprises a prefix indicating that the access identifier is not a regular International Mobile Subscriber Identity (IMSI).

2. The method of claim 1, wherein the grant allows the subscriber entity limited network access to a subscription portal entity.

3. The method of claim 2, wherein the grant comprises a network address of the subscription portal entity.

4. The method of claim 2, further comprising:
   receiving network configuration information and/or resource discovery information originating from the network node, and wherein the network configuration information and/or resource discovery information comprises a network address of the subscription portal entity.

5. The method of claim 2, further comprising:
transmitting a request for generation of a subscription profile for the subscriber entity towards the subscription portal entity.

6. The method of claim 5, wherein the request for generation of the subscription profile comprises identity information of the subscriber entity, and wherein the subscriber entity is authenticated by the subscription portal entity based on the identity information.

7. The method of claim 1, wherein the network access of the subscriber entity is limited to actions needed to be performed by the subscriber entity for subscription profile download.

8. The method of claim 1, wherein a cellular radio access technology is used for the network access of the subscriber entity.

9. The method of claim 1, wherein the access identifier is based on a hash of identity information of the subscriber entity.

10. The method of claim 1, wherein the generated hash value is smaller than the electronic identifier.

11. The method of claim 1, wherein the string inputted into the hash function further comprises a random value.

12. The method of claim 11, wherein the access identifier further comprises the random value.

13. A method for allowing initial network access of a subscriber entity to a radio access network, the method being performed by a network node, the method comprising:
receiving an attach message originating from the subscriber entity;
transmitting an identification request towards the subscriber entity, the identification request requesting identification of the subscriber entity;
receiving a response message from the subscriber entity, the response message comprising an access identifier identity of the subscriber entity, the access identifier indicating that the subscriber entity is subscription-less, wherein the access identifier comprises a hash value that was generated by hashing a string comprising an electronic identifier of the subscriber entity; and
transmitting a grant towards the subscriber entity, the grant allowing the subscriber entity limited network access, wherein
the access identifier further comprises a prefix indicating that the access identifier is not a regular International Mobile Subscriber Identity (IMSI).

14. The method of claim 13, wherein the grant allows the subscriber entity limited network access to a subscription portal entity.

15. The method of claim 14, further comprising:
providing the access identifier to the subscription portal entity.

16. The method of claim 13, wherein the grant is transmitted without the network node having authenticated the subscriber entity.

17. A method for verification of a subscriber entity, the method being performed by a subscription portal entity, the method comprising:
obtaining an access identifier of the subscriber entity from a network node of a radio access network for which network access of the subscriber entity has been requested; and
performing verification of the subscriber entity, wherein the access identifier received from the network node is used as reference by the subscription portal entity during the verification, wherein
the access identifier comprises a hash value that was generated by hashing a string an electronic identifier of the subscriber entity, wherein
using the access identifier received from the network node is used as reference comprises:
the subscription portal entity generating a hash value by inputting into a hash function a string that comprises the electronic identifier for the subscriber entity;
the subscription portal entity generating an identifier using the generated hash value, wherein the generated identifier comprises the generated hash value; and
the subscription portal entity comparing the generated identifier to the access identifier received from the network node, wherein
the access identifier further comprises a prefix indicating that the access identifier is not a regular International Mobile Subscriber Identity (IMSI).

18. The method of claim 17, further comprising:
receiving a request for generation of a subscription profile for the subscriber entity, the request originating from the subscriber entity.

19. The method of claim 18, wherein the verification of the subscriber entity is performed upon receiving the request.

20. A subscriber entity for initial network access of the subscriber entity to a radio access network, the subscriber entity comprising:
a receiver;
a transmitter; and
processing circuitry, the processing circuitry being configured to cause the subscriber entity to:
transmit an attach message towards a network node, the attach message indicating a request for network access of the subscriber entity to a radio access network of the network node;
receive an identification request originating from the network node, the identification request requesting identification of the subscriber entity;
generate a hash value by inputting into a hash function a string that comprises an electronic identifier for the subscriber entity;
generate an access identifier using the generated hash value, wherein the generated access identifier comprises the generated hash value;
transmit towards the network node a response message responsive to the identification request, the response message comprising the access identifier that comprises the generated hash value, the access identifier indicating that the subscriber entity is subscription-less; and
receive a grant from the network node, the grant allowing the subscriber entity limited network access, wherein
the access identifier further comprises a prefix indicating that the access identifier is not a regular International Mobile Subscriber Identity (IMSI).

21. A network node for allowing initial network access of a subscriber entity to a radio access network, the network node comprising:
a transmitter;
a receiver; and
processing circuitry, the processing circuitry being configured to cause the network node to:
receive an attach message originating from the subscriber entity;
transmit an identification request towards the subscriber entity, the identification request requesting identification of the subscriber entity;

receive a response message from the subscriber entity, the response message comprising an access identifier of the subscriber entity, the access identifier indicating that the subscriber entity is subscription-less, wherein the access identifier comprises a hash value that was generated by hashing a string comprising an electronic identifier of the subscriber entity; and transmit a grant towards the subscriber entity, the grant allowing the subscriber entity limited network access, wherein the access identifier further comprises a prefix indicating that the access identifier is not a regular International Mobile Subscriber Identity (IMSI).

22. A subscription portal entity for verification of a subscriber entity, the subscription portal entity comprising:

processing circuitry, the processing circuitry being configured to cause the subscription portal entity to:

obtain an access identifier of the subscriber entity from a network node of a radio access network for which network access of the subscriber entity has been requested; and perform verification of the subscriber entity, wherein the access identifier received from the network node is used as reference by the subscription portal entity during the verification, wherein the access identifier comprises a hash value that was generated by hashing a string comprising an electronic identifier of the subscriber entity, wherein the subscription portal entity is configured to use the access identifier received from the network node is used as reference by performing a process that includes:

generating a hash value by inputting into a hash function a string that comprises the electronic identifier for the subscriber entity;

generating and identifier using the generated hash value, wherein the generated identifier comprises the generated hash value; and comparing the generated identifier to the access identifier received from the network node, wherein the access identifier further comprises a prefix indicating that the access identifier is not a regular International Mobile Subscriber Identity (IMSI).

\* \* \* \* \*